United States Patent
Heinemann et al.

(10) Patent No.: US 6,553,832 B2
(45) Date of Patent: Apr. 29, 2003

(54) METHOD FOR THE DETERMINATION FOR AN ACTUAL SPEED OF A MOVABLE DISPLACEMENT ELEMENT

(75) Inventors: Gerhard Heinemann, Erlangen (DE); Stefan Kuenzel, Erlangen (DE)

(73) Assignee: Siemens Aktiengesellschaft (DE)

( * ) Notice: Subject to any disclaimer, the term of this patent is extended or adjusted under 35 U.S.C. 154(b) by 51 days.

(21) Appl. No.: 09/860,074

(22) Filed: May 17, 2001

(65) Prior Publication Data

US 2002/0000123 A1 Jan. 3, 2002

(30) Foreign Application Priority Data

May 17, 2000 (DE) .......................................... 100 24 394

(51) Int. Cl.$^7$ .............................................. G01P 15/00
(52) U.S. Cl. .............................. 73/489; 73/490; 73/492
(58) Field of Search .......................... 73/488, 489, 490, 73/491, 492, 495, 498, 503, 511; 700/63, 64; 702/141, 142, 149

(56) References Cited

U.S. PATENT DOCUMENTS

| | | | | |
|---|---|---|---|---|
| 4,357,833 A | * | 11/1982 | Wiklund et al. | ............... 73/490 |
| 4,880,082 A | * | 11/1989 | Kahkipuro et al. | ............ 73/490 |
| 4,935,748 A | * | 6/1990 | Schmidt et al. | ................ 367/27 |
| 5,445,028 A | * | 8/1995 | Bianchi et al. | ................ 73/593 |

OTHER PUBLICATIONS

German article by Wilhelmy et al., "Drehbeschleunigungssensor ermöglicht hochgenaue Drehzahlregelung", Messen, Prüfen, Oberwachen, Antriebstechnik 39, No. 4, p. 122–125, 1999.

German article by B. Hiller, "Relativbeschleunigungssensor–Potential und Einsatzmöglichkeiten in der Servo–Antriebstechnik", Lageregelseminar 1999, pp. 1–26.

* cited by examiner

Primary Examiner—Helen Kwok
(74) Attorney, Agent, or Firm—Baker Botts LLP

(57) ABSTRACT

Method for the determination for an actual speed of a movable displacement element wherein an acceleration sensor is used to record an acceleration (a), and a position sensor is used to record a measured position of a displacement element. A model speed (vM) and a measured speed (v1) are determined by integration and differentiation, respectively. The model speed (vM) is used to determine an actual speed (v). The model speed (vM) and the measured speed (v1) are subtracted from one another. The difference is supplied to a controller (13) having an integral component, whose output signal is added to the acceleration (a).

11 Claims, 1 Drawing Sheet

METHOD FOR THE DETERMINATION FOR AN ACTUAL SPEED OF A MOVABLE DISPLACEMENT ELEMENT

The present invention relates to a method for the determination of the actual speed of a movable displacement element. An acceleration sensor is used to record an acceleration of the displacement element and a model speed of the displacement element is determined by integrating the acceleration. A position sensor is used to record a measured position of the displacement element, and a measured speed of the displacement element is determined by differentiating the measured position. The actual speed is determined on the basis of the model speed.

BACKGROUND OF THE INVENTION

A determination method is disclosed, by way of example, in "Drehbeschleunigungssensor ermöglicht hochgenaue Drehzahlregelung" ("Rotary Acceleration Sensor Allows High Precision Rotation Speed (control)") by Lothar Wilhemly and Reinhard Domke, offprint from "Antriebstechnik" April 1999. A similar disclosure can be found in the paper "Relativbeschleunigungssensor—Potential und Einsatzmöglichkeiten in der Servo-Antriebstechnik" (Relative Acceleration Sensor—Potential and Opportunities For Use In Servo Drive Technology) by W. Hiller, ISW, Stuttgart, given at the ISW position control seminar 1998.

In such determination methods, the recorded acceleration must remain free of offset so that the model speed does not drift. In the latter of the above-mentioned publications, this is achieved by supplying the recorded acceleration and the measured position to an "observer" with the observer determining therefrom an offset for the recorded acceleration, which is then eliminated. The reference also mentions the design of a secondary acceleration control loop as an alternative.

SUMMARY OF THE INVENTION

The object of the present invention is to provide a determination method of the type mentioned in the introduction wherein in which any acceleration offset can be compensated for as simply as possible and yet with a high degree of precision.

This object is achieved as a result of the model speed and the measured speed being subtracted from one another, and the difference being supplied to a controller having an integral component, preferably to a PI controller, the output signal of which is added to the acceleration.

If the model speed is supplied with a time delay to the controller having an integral component, it is possible to compensate for the offset using a relatively high control dynamic range.

If the controller, having an integral component, has controller parameters which can be set in situ, the controller parameters can be matched in situ to the circumstances specifically prevailing there.

If a model position is determined by integrating the actual speed, and the model position is used to determine an actual position, the acceleration can also be used to calculate the actual position.

If the actual position and the measured position are subtracted from one another and the difference is supplied to a P controller whose output signal is added to the actual speed, the actual position can also be determined without an offset.

If the actual position has a time delay with respect to the model position, the control works more precisely.

If the P controller has controller parameters which can be set in situ, the controller parameters can be matched in situ to the circumstances specifically prevailing there.

BRIEF DESCRIPTION OF THE DRAWINGS

Other advantages and details are provided in the description hereinbelow of an exemplary embodiment.

DETAILED DESCRIPTION OF THE INVENTION

Figure 1:
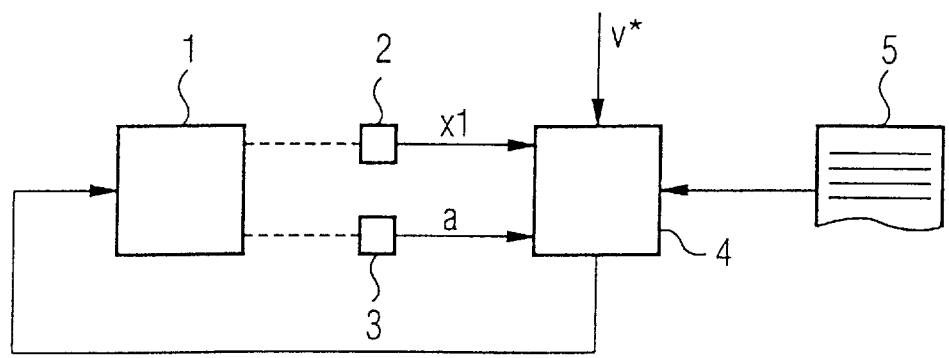
FIG. 1 shows a basic illustration of a control arrangement having a displacement element.

In accordance with FIG. 1, movement of a displacement element 1 is recorded both using a position sensor 2 and using an acceleration sensor 3. In this case, the position sensor 2 records a measured position (x1), and the acceleration sensor 3 records an acceleration (a). In this context, the acceleration (a) and the measured position (x1) may optionally be linear or rotatory variables.

The acceleration (a) and the measured position (x1) are supplied to a control arrangement 4. The control arrangement 4 may be a hardware controller. Preferably, however, the control arrangement 4 is a software controller processing a computer program product 5. In this case, the control arrangement 4 has been programmed with the computer program product 5 and operates on the basis of the programming by the computer program product 5.

The control arrangement 4 uses the transmitted acceleration (a) and/or the transmitted measured position (x1) to determine an actual speed (v), and compares this actual speed with a nominal speed (v*). The control arrangement 4 then readjusts the displacement element 1 such that the actual speed (v) is brought into line with the nominal speed (v*).

Figure 2:
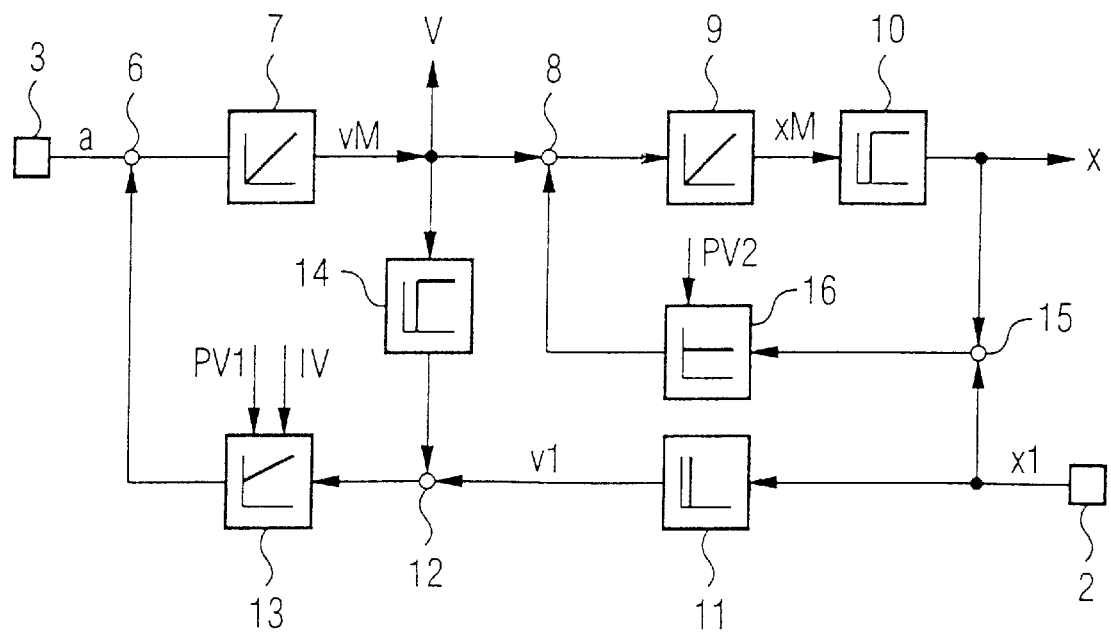
FIG. 2 shows a basic illustration of the internal structure of the control arrangement from FIG. 1.

In accordance with FIG. 2, the acceleration (a) is supplied to a first integrator 7 via a first addition point 6. The integrator integrates the signal supplied to it and thus determines a model speed vM by integrating the acceleration (a). The model speed vM is used as actual speed (v). It is supplied to a second integrator 9 via a second addition point 8. This integrator determines a model position xM by integrating the actual speed (v), and outputs this model position. The second integrator 9 has a first delay element 10 arranged downstream, so that the output signal from the first delay element 10 corresponds to the actual position (x).

The measured position (x1) is supplied to a differentiator 11 which determines a measured speed (v1) for the displacement element 1 by differentiating the measured position (x1). The measured speed (v1) and the model speed (vM) are supplied to a first subtraction point 12. There, the model speed (vM) and the measured speed (v1) are subtracted from one another. The difference is supplied to a first controller 13. The output signal from this controller is supplied to the first addition point 6 and thus compensates for any offset in the measured acceleration (a). The model speed (vM) is supplied to the first subtraction point 12 via a second delay element 14, so that variables (vM), (v1) corresponding to the same times are compared with one another in the first controller 13.

The measured position (x1) and the actual position (x) are supplied to a second subtraction point 15. There, the actual position (x) and the measured position (x1) are subtracted from one another. The difference is supplied to a second controller 16, whose output signal is added to the actual speed (v) using the second addition point 8.

The first controller 13 is in the form of a PI controller. It therefore has at least two controller parameters, namely a proportional gain PV1 and an integral gain IV. In particular, it thus has an integral component. The second controller 16 is in the form of a P controller. It therefore has at least one controller parameter, namely a second proportional gain PV2.

To be able to use the control arrangement 4 as flexibly as possible, the controller parameters PV1, PV2, IV can be set in situ. This is indicated in FIG. 2 by corresponding arrows for the controllers 13, 16. It has been found to be particularly advantageous if the controller parameters PV1, IV of the first controller 13 are chosen such that any control error is corrected after five to a thousand, in particular after one hundred to three hundred, system clock cycles.

On account of the first controller 13 being in the form of a PI controller, it nullifies any offset, however small, in the acceleration sensor 3. It is therefore not possible for any speed offset to arise in the integration path in the steady state. For this reason, it is sufficient for the second controller 16 to be in the form of a P controller.

The novel determination method and the novel control arrangement 4 make it a simple matter to control the speed of the displacement element 1 with high precision, without there being any risk of the model speed (vM) derived from the acceleration (a) drifting away.

We claim:

1. A method for the determination of an actual speed of a movable displacement element, comprising:
   recording an acceleration of the displacement element with an acceleration sensor;
   determining a model speed of the displacement element by integrating the acceleration recording;
   recording a measured position of the displacement element using a position sensor;
   determining a measured speed of the displacement element by differentiating the measured position;
   determining the actual speed of the displacement element on the basis of the model speed by subtracting the model speed and the measured speed from one another, and supplying the difference to a controller having an integral component, the output signal of which is added to the acceleration recording.

2. The method according to claim 1, wherein the controller is a PI controller.

3. The method according to claim 1, wherein the model speed is supplied with a time delay to the controller.

4. The method according to claim 1, wherein the controller has controller parameters, which can be set in situ.

5. The method according to claim 1, wherein a model position is determined by integrating an actual speed and the model position is used to determine the actual position.

6. The method according to claim 5, wherein the actual position and the measured position are subtracted from one another and the difference is supplied to a P conroller, the output signal of which is added to the actual speed.

7. The method according to claim 6, wherein the actual position is given a time delay with respect to the model position.

8. The method according to claim 6, wherein the P controller has controller parameters which be set in situ.

9. A computer program for carrying out the method according to claim 1.

10. A control arrangement for carrying out the method according to claim 1.

11. The control arrangement according to claim 10, wherein the control arrangement is programmed using a computer program.

* * * * *